United States Patent
Briane et al.

(10) Patent No.: US 8,917,046 B2
(45) Date of Patent: Dec. 23, 2014

(54) RAPID REVERSIBLE CHARGING DEVICE FOR AN ELECTRIC VEHICLE

(75) Inventors: Benoit Briane, Guyancourt (FR); Serge Loudot, Villiers le Bacle (FR)

(73) Assignee: Renault S.A.S., Guyancourt (FR)

( * ) Notice: Subject to any disclaimer, the term of this patent is extended or adjusted under 35 U.S.C. 154(b) by 749 days.

(21) Appl. No.: 12/866,997

(22) PCT Filed: Jun. 16, 2010

(86) PCT No.: PCT/EP2010/058484
§ 371 (c)(1),
(2), (4) Date: Jul. 7, 2011

(87) PCT Pub. No.: WO2010/146092
PCT Pub. Date: Dec. 23, 2010

(65) Prior Publication Data
US 2011/0254494 A1    Oct. 20, 2011

(30) Foreign Application Priority Data
Jun. 16, 2009 (FR) ..................... 09 54024

(51) Int. Cl.
| | | |
|---|---|---|
| H02P 1/30 | (2006.01) | |
| H02P 1/52 | (2006.01) | |
| H02P 3/00 | (2006.01) | |
| B60L 11/18 | (2006.01) | |
| H02J 7/02 | (2006.01) | |

(52) U.S. Cl.
CPC ......... *B60L 11/1811* (2013.01); *B60L 11/1842* (2013.01); *B60L 11/1844* (2013.01); *H02J 7/022* (2013.01); *Y02T 10/7005* (2013.01); *Y02T 10/92* (2013.01); *Y02T 90/127* (2013.01); *B60L 2220/54* (2013.01); *Y02T 10/7088* (2013.01); *Y02T 90/163* (2013.01); *Y02T 10/641* (2013.01); *Y02T 90/14* (2013.01); *Y02T 90/128* (2013.01); *Y04S 10/126* (2013.01); *Y02E 60/721* (2013.01)
USPC .......................................................... 318/503

(58) Field of Classification Search
CPC .............. Y02T 10/7005; Y02T 1/7038; Y02T 10/7077
USPC .......................................................... 318/503
See application file for complete search history.

(56) References Cited

U.S. PATENT DOCUMENTS 5,127,085 A * 6/1992 Becker et al. ................. 318/434
5,677,604 A   10/1997 Masaki et al.

(Continued)

FOREIGN PATENT DOCUMENTS

| EP | 0 762 623 | 3/1997 |
|---|---|---|
| EP | 0 834 977 | 4/1998 |
| WO | 2008 096664 | 8/2008 |

OTHER PUBLICATIONS

U.S. Appl. No. 13/132,727, filed Jun. 3, 2011, Briane, et al.

(Continued)

*Primary Examiner* — Erick Glass
(74) *Attorney, Agent, or Firm* — Oblon, Spivak, McClelland, Maier & Neustadt, L.L.P.

(57) ABSTRACT

A device for generating electric power of a traction system of a motor vehicle powered by a battery, including a first rectifier stage configured to be connected to a power supply network or to a load to be powered, a second inverter stage configured to be connected to the battery, a mechanism regulating average current flowing between the first stage and the second stage, and a controller controlling a transfer of electric power between the power supply network and the battery or the powering of a load.

20 Claims, 7 Drawing Sheets

(56) References Cited

U.S. PATENT DOCUMENTS

| | | |
|---|---|---|
| 5,742,493 A | 4/1998 | Ito et al. |
| 5,952,812 A | 9/1999 | Maeda |
| 6,172,480 B1 * | 1/2001 | Vandelac ........................ 320/125 |
| 6,301,132 B1 * | 10/2001 | Vandelac ..................... 363/56.01 |
| 6,337,801 B2 * | 1/2002 | Li et al. .......................... 363/127 |
| 6,683,389 B2 * | 1/2004 | Geis ............................ 290/40 C |
| 7,476,987 B2 * | 1/2009 | Chang ............................. 290/55 |
| 7,598,623 B2 * | 10/2009 | Fattal et al. .................. 290/40 F |
| 7,746,024 B2 * | 6/2010 | Rozman et al. ................ 318/722 |
| 8,503,204 B2 * | 8/2013 | Carletti et al. ................... 363/78 |
| 2008/0316774 A1 | 12/2008 | Ito et al. |
| 2010/0090533 A1 | 4/2010 | Shimada et al. |
| 2010/0266875 A1 * | 10/2010 | Somogye et al. ................. 429/7 |

OTHER PUBLICATIONS

U.S. Appl. No. 14/111,925, filed Oct. 15, 2013, Gati, et al.
Cox, N. R., "A Universal Power Converter for Emergency Charging of Electric Vehicle Batteries," Applied Power Electronics Conference and Exposition, pp. 965-969, (Mar. 5, 1995) XP 010147691.
International Search Report issued Aug. 13, 2010 in PCT/EP10/058484 filed Jun. 16, 2010.

* cited by examiner

RAPID REVERSIBLE CHARGING DEVICE FOR AN ELECTRIC VEHICLE

The invention relates to the reversibility of a device for charging a battery and for powering a load from the battery, and more particularly a device integrated into the vehicle making it possible to recharge the battery by controlling the absorbed current of the network or to power a load from the battery of the vehicle.

"Reversibility", in the context of the present description, means the capacity for one and the same device to have a first function of charging a battery from a power supply network and a second function of generating electric power to an electricity network or a load from the battery.

One of the major drawbacks of the electric vehicle relates to its availability. Specifically, when its battery is discharged, the electric vehicle remains unavailable throughout the recharging period which can be up to several hours. In order to reduce the period for recharging the battery, it is known practice to increase the charging power by increasing the current taken from the network. It has also been proposed to take this current from a three-phase network rather than from a single-phase network, the charging power being greater when the current is taken from a three-phase power supply network.

When a rechargeable electric or hybrid vehicle has a considerable recharging power, thereby allowing a rapid charge, two operating opportunities may arise inasmuch as the electronic recharging topology is reversible.

A first function makes it possible to return energy to the power supply network according to a setpoint of the operator of the electric power distribution network, thereby offering the possibility to the operator, in a situation in which a sufficient number of vehicles are provided therewith, to optimize the management of the power supply network.

A second function makes it possible to use the vehicle as a substitute power source in the event of failure of the domestic electricity network, or to make use of this source as a generator in a location where there is no electricity supply.

Documents JP 2008 199780, JP 2007 062642, JP 08 12612 and U.S. Pat. No. 5,099,186 describe an architecture which comprises two inverters and two machines and a DC/DC step-up and reversible converter between a battery and a continuous bus. These architectures allow exchanges only with a single-phase network. Moreover, the inverters cannot be applied to an electric vehicle capable of accommodating a three-phase charge.

Document WO 2004 009397 describes a device for charging a battery of an electric vehicle that allows power to be sent back to the power supply network only by virtue of a reconfiguration of the circuit by relays, and that demands a minimum of filtering inductors which cannot be onboard the vehicle. Moreover, the voltage of the battery of this charging device must be compatible with the voltage of the power supply network.

The object of the invention is therefore to solve the drawbacks mentioned above and, in particular, to propose an integrated reversible charging device making it possible to charge a battery of a motor vehicle directly from a single-phase or three-phase network and to do so without using a contactor, and to power a load or to return electric power to the network.

The subject of the invention, according to a first aspect, is therefore an electronic device for charging and/or for generating electric power for a traction system of a motor vehicle coupled to a battery, comprising a first rectifier stage designed to be connected to a power supply network or to a load to be powered, a second inverter stage designed to be connected to the battery, and means for regulating the average current flowing between the first stage and the second stage.

This device comprises control means capable of controlling a transfer of electric power between the power supply network and the battery or the powering of a load.

Preferably, the control means comprise current-regulation means capable of regulating the power supply current of the network as a function of a current setpoint of the power supply network and voltage-regulation means capable of regulating the voltage at the terminals of a load.

Moreover, the device may comprise connection means capable of directly connecting the first rectifier stage to a three-phase or single-phase electricity service, such as a three-phase power supply network or to a single-phase power supply network, or a load.

It is also possible to connect the rectifier input stage to an alternating-current or direct-current single-phase power supply.

Advantageously, the first rectifier stage may comprise first controlled rectifying means capable of rectifying the current in a first on-state direction and second controlled rectifying means capable of rectifying the current in a second on-state direction opposite to the first on-state direction.

The first stage may also comprise freewheel means capable of allowing the current to flow in the second stage when the other elements of the first stage are in an off-state.

Preferably, the freewheel means comprise a first freewheel circuit capable of allowing the current to flow in one direction and a second freewheel circuit capable of allowing the current to flow in another direction opposite to the direction of the first circuit.

The freewheel means preferably comprise at least one freewheel diode and/or at least one freewheel transistor.

The freewheel diode, if it can be functionally eliminated for the benefit of a short circuit of an arm of the input stage, has the advantage of reducing losses by dissipation. Specifically, the dissipation in a diode is much less than when the current has to flow in two diodes and two transistors in series. It also has an advantage in safety of operation in the event of drift or loss of control. Specifically, in this case, the procedure used is limited to ordering all the transistors to off-state and the current of the stator coils can then continue to flow through this diode.

In the direction opposite to the on-state direction of the freewheel diode, a freewheel transistor can be used. This controlled freewheel transistor is then in the on-state only when the current flows in the direction opposite to the on-state direction of the freewheel diode and the other transistors of the first stage are in the off-state.

Since the device can be designed to be installed in a motor vehicle comprising at least one electric traction device, i.e. a device comprising at least an electric motor and an inverter stage, the second inverter stage can advantageously be formed by the inverter stage of the traction system of the vehicle.

In this manner, the charging device is thus integrated into the vehicle and does not require the use of an additional inverter output stage to the extent that use is made of the inverter stage already present in the vehicle.

Advantageously, the device may comprise filtering means integrated into the vehicle that are capable of filtering the power supply network current drawn off by the device.

The current drawn off from the three-phase power supply network can be essentially filtered by input capacitors and by an electromagnetic compatibility (EMC) filter so that this current satisfies the harmonic template of the requirements for connection to the network.

Moreover, the inductance of the stator coils of the electric vehicle can be used as a power buffer filter. Specifically, when the charging power is high, the space requirement and the weight of such an inductive and/or capacitive filter would become prohibitive to be installed onboard a motor vehicle.

Preferably, the filtering means integrated into the vehicle comprise protection means capable of protecting the circuit from current peaks when the device is connected to a power supply network.

The protection means may comprise a triac for each phase of the power supply network, or an arrangement equivalent to a triac, such as an anti-parallel arrangement of two thyristors.

According to another aspect, the proposal is for a method of loading and/or generation of electric power for a traction system of a motor vehicle coupled to a battery.

In this method, the user controls a transfer of electric power between the power supply network and the battery, or controls the powering of a passive load.

When a transfer of electric power is controlled between the power supply network and the battery, it is advantageously possible to regulate the current generated in each phase of the power supply network based on a current setpoint generated based on a measurement of the voltage of the power supply network.

When the user controls the powering of a load, it is advantageously possible to regulate the voltage at the terminals of the load with the aid of a regulation loop.

It is advantageously possible to directly connect the first stage to a three-phase power supply network or to a single-phase power supply network or to a load.

In other words, the first stage is connected to a three-phase or single-phase power supply network without using a contactor. It is therefore possible to ensure the operation as a charger and as traction without having to use contactors in order to switch from one configuration to the other.

Moreover, it is possible to directly connect the first stage to a direct-current single-phase power supply network.

Advantageously, the current of a second stage of the freewheel means is allowed to flow in a freewheel phase.

Thus, the current delivered by the stator coils can continue to flow in the freewheel diodes.

Preferably, the current of the power supply network is filtered with the aid of integrated filtering means.

Advantageously, the integrated filtering means are protected from current peaks due to the connection to the power supply network.

Other advantages and features of the invention will become evident on examining the detailed description of an embodiment that is in no way limiting of a device for charging and/or for generating electric power according to the invention and the appended drawings in which.

Figure 1:
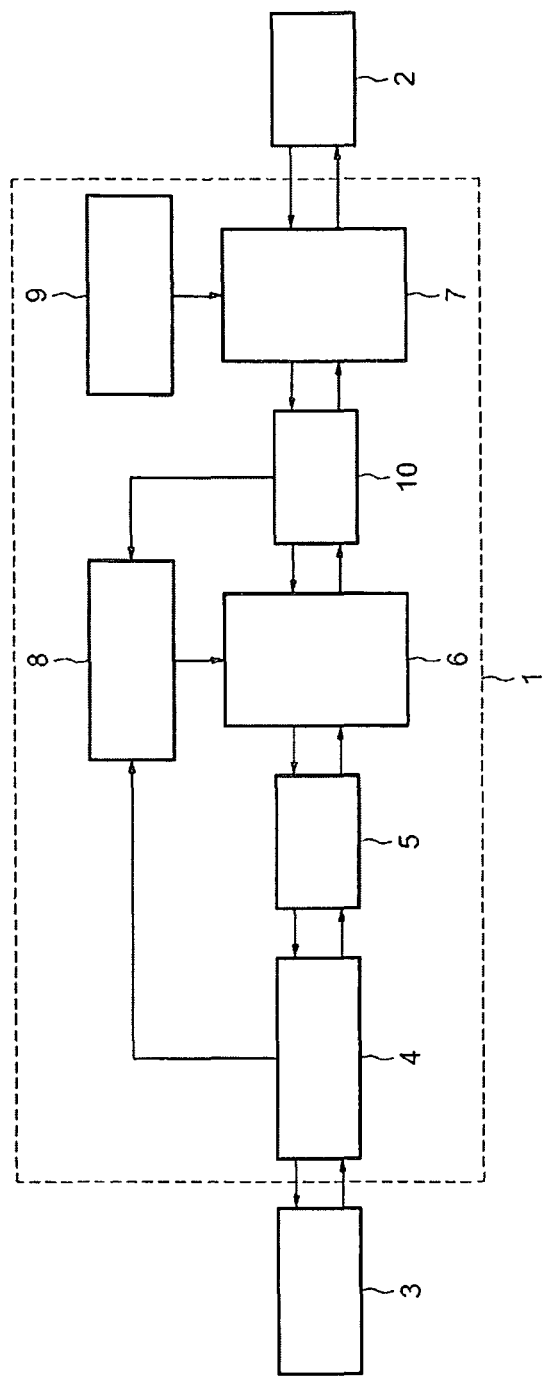
FIG. 1 represents schematically a device for charging and/or generating electric power of an electric vehicle according to one embodiment.

FIG. 1 shows schematically a device 1 for charging and/or generating electric power of a traction system of an electric or hybrid motor vehicle coupled to a battery 2. The device is also coupled to a power supply network or to a load 3.

This device 1 is an integrated device, that is to say installed onboard the vehicle. It is designed, in a recharge mode, to charge the battery in order to supply the power necessary for propulsion and, in a generation mode, to power a load from the current supplied by the battery. It should also be noted that it is designed to charge the battery either from a single-phase power supply network or from a three-phase power supply network. Finally it is designed, in a recharge mode, to return electric power to the power supply network according to a power supply setpoint of the network.

The device 1 comprises connection means 4 for making it possible to connect the charging device 1 to the power supply network or to the load 3. For example, a suitable connection means could be an industrial connector assembly commercially available from Yazaki that is compliant with the SAE standard J1772. Other similar plugs could also be suitable. It also comprises filtering means 5 making it possible to filter the current of the power supply network drawn off by the device 1.

The device 1 also comprises a first rectifier stage 6 coupled to the output of the filtering means 5 and making it possible to rectify the alternating current originating from the power supply network 3, or to rectify the current that is delivered to it via a second inverter stage 7 connected to the battery 2. The first stage 6 and the second stage 7 are controlled by first and second control means respectively 8 and 9 which can be independent controllers.

The first control means 8 of the input stage 6 receive as an input a signal originating from a module 10 for measuring the output current of the input stage 6, also making it possible, in a recharge mode, to control a regulation of the average current originating from the first rectifier stage 6. Specifically, the average current originating from the first rectifier stage 6 is controlled to be equal to a current value established based on the maximum current supplied by a power supply network 3 and as a function of a coefficient at least equal to a ratio between a maximum voltage rectified by the first rectifier stage 6 and the voltage of the battery 2.

Figure 2:
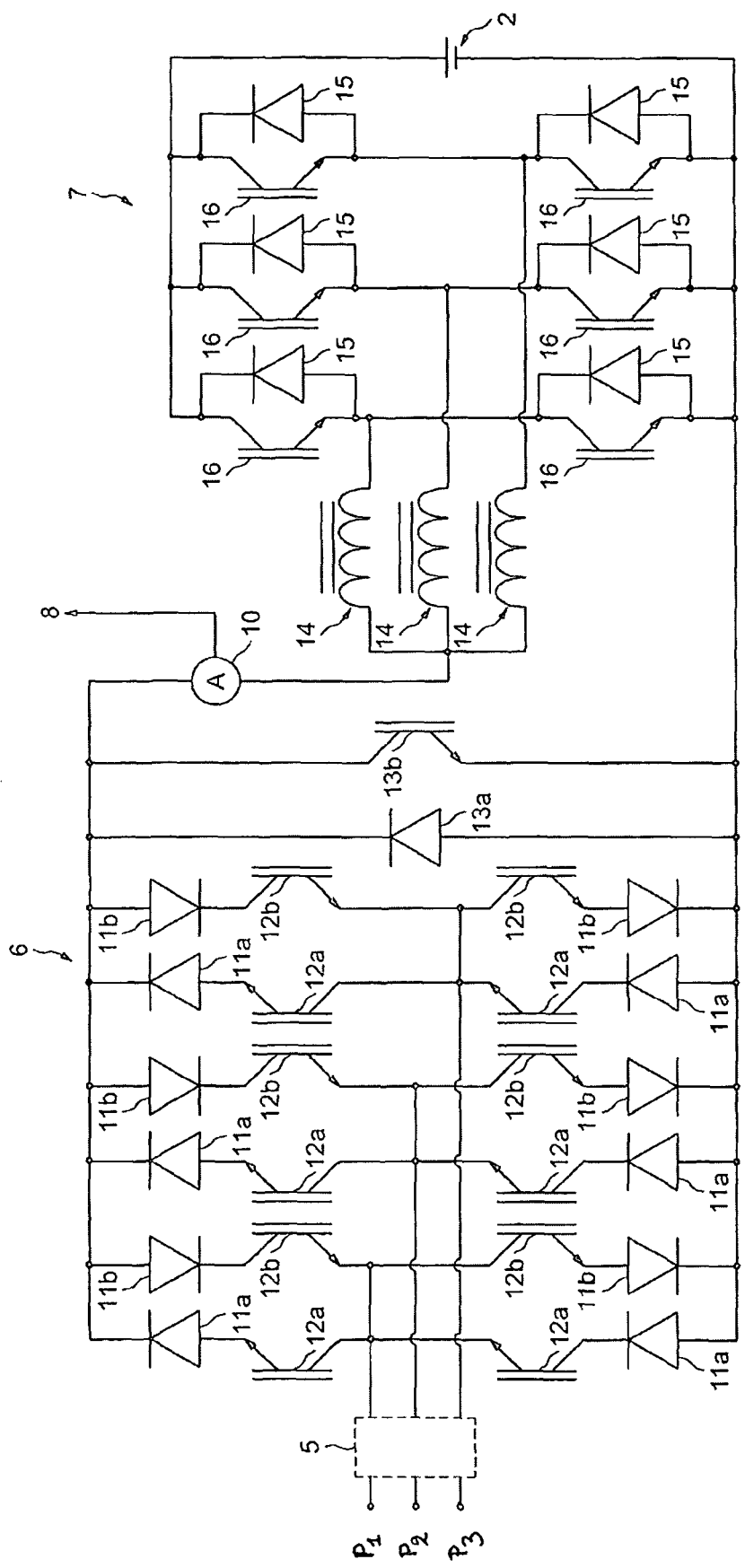
FIG. 2 illustrates, in a more detailed manner, an embodiment of a device for charging and/or generating electric power.

FIG. 2 shows in a more detailed manner an embodiment of a device 1 for charging and/or generating electric power of a traction system of an electric or hybrid motor vehicle coupled to a battery 2.

The device 1 shown in FIG. 2 comprises three available phases. The three phases can be coupled to a three-phase power supply network or a single-phase power supply network. In the latter case, the two available phases are coupled to the phase and to the neutral of the single-phase power supply network, and the third available phase is not used. The three phases can also be coupled to a load to be powered in three-phase or single-phase mode.

The first rectifier stage 6 comprises a first rectifying circuit comprising diodes 11a that are in the on-state in a first direction of flow of the current, which diodes are coupled in series to transistors 12a. The first rectifying circuit comprises three identical branches coupled in parallel. Each of the branches comprises an arrangement in series comprising successively a diode 11a, two transistors 12a, and a diode 11a. Each branch is also coupled to a distinct phase, the coupling being carried out between the two transistors 12a.

This first rectifying circuit is coupled in parallel to at least one freewheel diode 13a that is in the on-state in the first direction of flow of the current.

Moreover, the first rectifier stage 6 comprises a second rectifying circuit comprising diodes 11b, that are in the on-state in a second direction of flow of the current opposite to the first direction, coupled in series to transistors 12b. The second rectifying circuit also comprises three identical branches coupled in parallel. Each of the branches comprises an arrangement in series comprising successively a diode 11b, two transistors 12b and a diode 11b. Each branch is also coupled to a distinct phase, the coupling being carried out between the two transistors 12b.

This second rectifying circuit is coupled in parallel to at least one freewheel transistor 13b which is in the on-state in the second direction of flow of the current opposite to the first direction of flow.

The first and the second rectifying circuits are coupled together so as to make only one circuit comprising six rectifying branches and two freewheel branches.

The first rectifier stage 6 is coupled at the output to a module 10 for measuring the current originating from the input stage 6, such as an ammeter, for the purpose of regulating this current through the control of the first rectifier stage 6.

The second inverter stage 7 is coupled to the output of the measurement module 10 via three stator coils 14. Each stator coil 14 is coupled at the input to the measurement module 10. Therefore, the current originating from the rectifier input stage 6 is divided in the 3 branches of a circuit of the second inverter stage 7.

Specifically, the second inverter stage 7 also comprises a circuit comprising three branches coupled in parallel. Each branch comprises a coupling in series of two arrangements each comprising a diode 15 and a transistor 16 coupled in parallel. The two diodes 16 of one and the same branch are mounted in the same on-state direction.

Each coil 14 is coupled to a branch of the circuit of the second inverter stage 7. The coupling is carried out between the two arrangements coupled in series.

The second inverter stage 7 is also coupled to the battery 2.

In recharge mode, that is to say when the device 1 is connected to a power supply network, the charging of the device 1 can be optimized. The optimization of the device 1 consists in adjusting the minimum output average current of the first rectifier stage 6, as a function of the voltage of the battery 2 rather than leaving this current permanently at its highest value. Since the amount of current input into the battery decreases while the battery is being charged at a constant power supply from the network, the minimum output average current of the first rectifier stage 6 can be decreased and is maintained above the value of the current that is input into the battery 2 by a fixed predetermined value of current. This predetermined value of current is chosen to ensure that the output average current of the first rectifier stage 6 is at all times higher than the current input in the battery provided the imperfections, such as ripple, in the output average current signal of the first rectifier stage 6.

In a non-limiting exemplary embodiment, the device 1 is connected to a 400 Volts three-phase power supply network 3 that supplies a current of 32 amps. The current in the battery 2 is around 70 Amps at 300 Volts battery voltage. Therefore, the control means 8 set the fixed predetermined value at 20 amps. Thus, when the current in the battery 2 is measured at 70 amps, the first control means 8 controls the first stage 6 such that the minimum output average current is equal to 90 amps (i.e. equal to 70 amps of the battery 2 plus the fixed predetermined value of 20 amps).

This improves the efficiency of the first rectifier stage 6 by reducing the losses of the transistors 12 which switch a lower current.

In these conditions, the charging device obtains an average voltage at the output of the first rectifier stage 6, that is to say at the terminals of the freewheel diode 13a, that is lower than the voltage of the battery 2. The second inverter stage 7 consisting of the traction inverter and the stator coils 14 can then be controlled.

More particularly, the low average voltage is due to the freewheel phases, that is to say conduction phases, of the freewheel diode 13a during which the voltage at its terminals is virtually zero, give or take the voltage drop of the junction of the diode 13a.

It is therefore possible to sequentially control each transistor 12a of the first rectifier stage 6 with the freewheel phases, by virtue of the first control means 8 of the input stage. It is therefore possible to directly control the rectifier input stage 6 by adjusting a duty cycle of a transistor-switching signal or by using a regulation loop, or by using a regulation loop and adjusting the duty cycle of the switching signal in order to dispatch the current into the power supply network phases according to a given value coming from regulation loop. This power supply network phase current is distributed in high frequency pulses (minimum ten times higher than the network frequency) with variable duty cycle, varying with a current setpoint. The diode 13A acts as a free wheeling diode when all transistors are in the off-state, thus preventing the rectifier input stage 6 from abruptly stopping the current flow in the stator.

It is, for example, possible to optimize the spectrum of the voltage at the terminals of the freewheel diode 13a, to have the voltage across the terminals of the stator coils 14 be as small as possible, thus minimizing voltage ripple on the rectifier output current. This voltage is then better filtered by the stator of the electric vehicle.

It is also possible to minimize the number of switchings and therefore the losses generated by the first rectifier stage 6. In contrast, the voltage produced in this case contains lower-frequency harmonics, for example up to six times the power supply network frequency, which will then be less filtered by the stator coils 14. Therefore, a compromise can be found between having reduced losses in the first rectifier stage 6 and losses (mainly by heat) induced by the lower-frequency harmonics in the stator coils 14.

The first control means 8 of the first stage 6 control the current drawn from the three-phase power supply network 3 by cyclic ratios of the current pulses that are applied to the control electrodes of the transistors 12a of the first rectifier stage 6.

The second inverter stage 7 comprises elements specific to the traction of the electric vehicle. In other words, the inverter stage of the traction system in this instance forms the second stage 7 of the device 1.

In this case, the function of this second stage is to supply a defined charging current in the battery, necessarily lower than the average current originating from the first rectifier stage 6, based on the regulated current originating from the first rectifier stage 6.

In order to limit the harmonic spectrum of the currents that flow in the battery, each branch of the second inverter stage 7 can also be controlled by second control means 9 which can be independent of the control means 8 of the first stage 6. The pulse phase of each branch of the circuit of the second inverter stage 7 is, for example, offset by a third of a period.

Each branch of the circuit of the second inverter stage 7 can be driven individually with a regulation loop which is specific to it, or collectively, that is to say the same cyclic ratio is applied to the control of each branch.

The second rectifying circuit comprising the diodes 11*b*, the transistors 12*b* and the freewheel transistor 13*b* which are in the on-state in the second direction of flow of the current makes it possible to make the charger reversible. That is to say that the device 1 can also be used in an electric power generation mode. Operation in generation mode is symmetrical with the function in recharge mode except for the freewheel phase which is controlled by a freewheel transistor 13*b*.

In electric power generation mode, the control of the first stage 6 differs depending on the connection of the device 1. Specifically, the control will be different if the device 1 is connected to a power supply network and returns electric power to the power supply network, in the event that the device 1 is connected to a load which is to be powered by the device 1.

Figure 3:
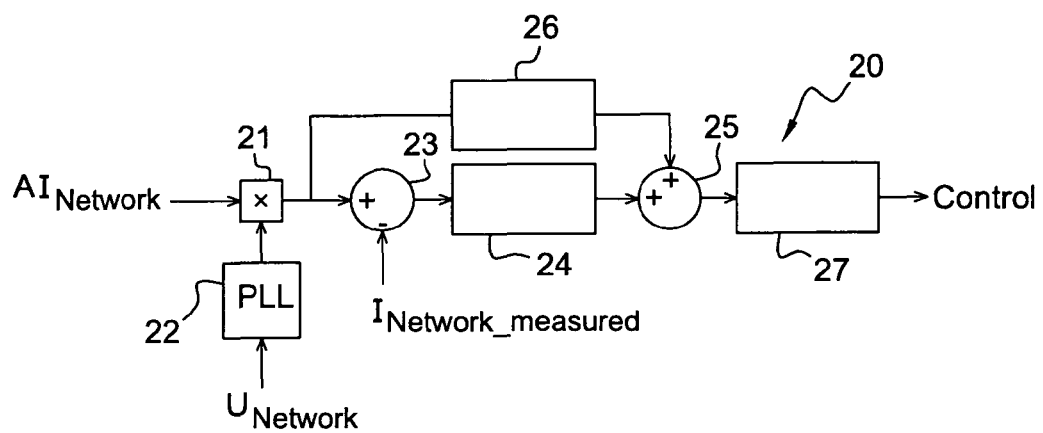
FIG. 3 shows an example of control means for a device connected to a power supply network.
Figure 4:
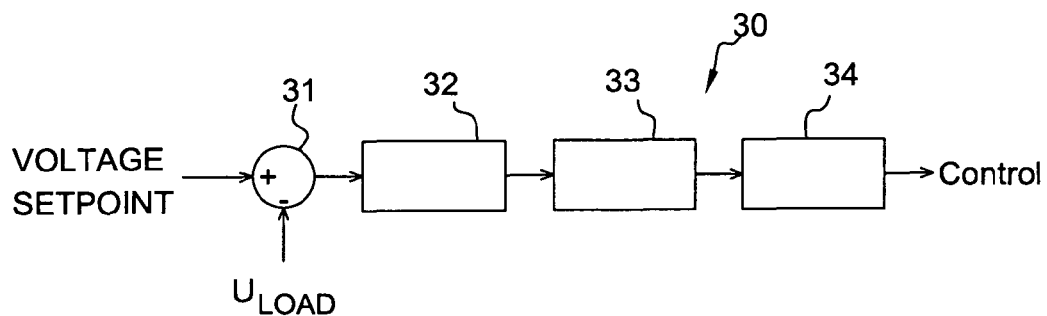
FIG. 4 shows an example of control means for a device connected to a load.

These differences of control are explained with the following FIGS. 3 and 4.

FIG. 3 shows an example of a control means 20 for a current regulation of the first stage 6 when the device 1 is connected to a power supply network.

The particular feature of the control consists in controlling the amplitude, that is the power, of the current in phase with the voltage injected into the network. The control means 20 are included in the first control means 8 of the first rectifier stage 6.

The control means 20 are made up so as to regulate the current generated in the power supply network. They also allow the placing in phase of the current setpoint, the voltage of the network, the closed-loop control of the amplitude of this current, the putting in place of a modulation strategy which generates the control of the transistors. They comprise computing means 21, for example, a digital controller, phasing means 22 such a PLL (Phase Locked Loop) circuit, first comparison means 23, current regulation means 24, summing means 25, proaction means 26, and strategic means 27, such means 23-27 can be implemented as mathematical functions in the digital controller.

The principle of control consists in locking in the current generated in the power supply network so as to control the power supplied and the shape of the current in order to satisfy the conditions of connection imposed by the manager of the power supply network on the one hand, and to maximize the power factor on the other hand, the power factor being defined by the cosine of the difference in phase between the current and the voltage of the network.

A current setpoint $A_{1network}$, corresponding to the amplitude of the current that the device wishes to reinject into the power supply network, is delivered to the computing means 21 also receiving as an input a measurement of the voltage of the power supply network $U_{Network}$, the voltage imposed by the power supply network distributor, via phasing means 22, such as a phase-locked loop for example. The computing means 21 therefore deliver as an output a setpoint of network current in phase with the voltage at the terminals of the network.

The setpoint of network current is delivered to first comparison means 23 which also receive as an input a measurement of the network current corresponding to the current really returned by the device 1 to the power supply network. The first comparison means 23 determine the difference that exists between the network current setpoint and the network current measurement, and deliver the value of this difference to the current regulation means 24.

The current regulation means 24 then deliver as an output a regulation signal to the summing means 25 which also receive as an input the network current setpoint originating from the computing means 21 via proaction means 26 capable of modifying the network current setpoint. The summing means 25 deliver as an output a signal resulting from the two input signals to the strategic means 27 capable of determining a control of the device 1, for example according to values stored on a memory of the digital controller in a Look-Up table, in order to regulate the current of the device 1 generated to the power supply network.

FIG. 4 shows an example of control means 30 for regulating the voltage of the first stage 6 when the device 1 is connected to a load. The control means 30 are included in the first control means 8 of the first rectifier stage 6.

In this configuration, the load must be supplied with a regulated voltage irrespective of the current delivered, within the limit of the maximum allowed current.

The voltage-regulation control means 30 comprise second comparison means 31, voltage-regulation means 32, saturation means 33 and strategy means 34. These means 30-34 can be implemented as mathematical functions in the digital controller.

A voltage setpoint, corresponding to the voltage that the device 1 must deliver to the connected load, is delivered to the second comparison means 31 which also receive as an input a measurement of the voltage delivered by the device 1 at the terminals of the load, $U_{load}$. The second comparison means 31 determine the difference between the two signals and deliver the result signal to the voltage-regulation means 32.

The voltage-regulation means 32 determine a voltage-regulation signal which they deliver to the saturation means 33 which are capable of saturating the amplitude of the current delivered by the device 1 to the load so as not to overload the converter, thus reducing the voltage applied to the load when its impedance becomes too low, so as to limit the delivered current to its maximum.

The saturation means 33 deliver as an output a signal, saturated if necessary, to the strategy means 34 which are capable of determining a control of the device 1, for example by matching the signal received from the saturation means 33 to a desired voltage value by means of a Look-up table, in order to regulate the voltage of the device 1 generated at the terminals of the load.

The structure of control means 9 can be substantially the same than control means 8. These controls means can be implemented in a single common controller or in two separate and distinct controllers.

Figure 5:
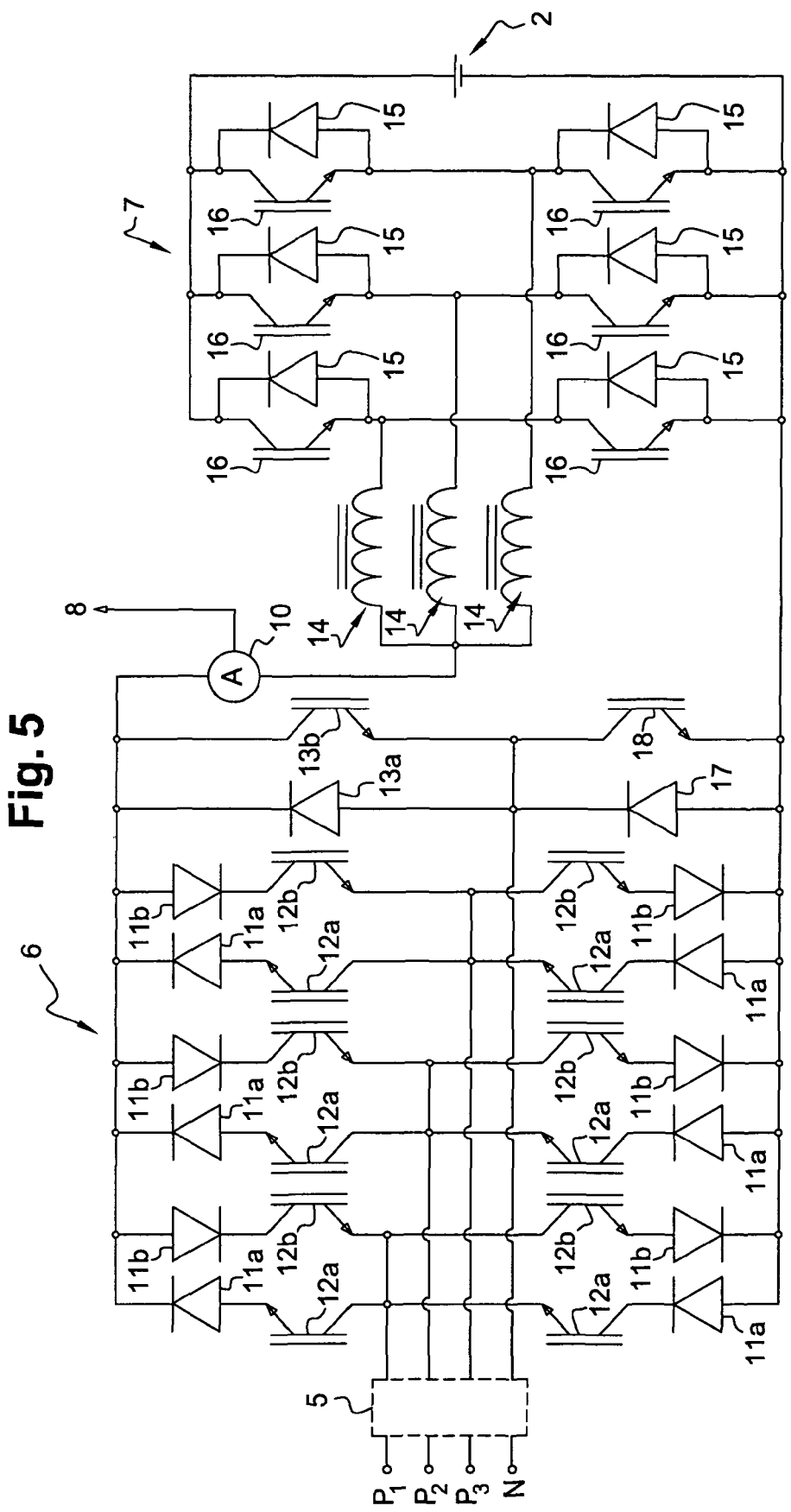
FIG. 5 represents another embodiment of a device for charging and/or generating current.

FIG. 5, in which the elements that are identical to those of FIG. 2 bear the same references, shows another embodiment of a device 1.

In this embodiment, the three phases are marked $P_1$, $P_2$ and $P_3$ and neutral is marked N. In this case, a second freewheel diode 17 is added to the first freewheel circuit of the first rectifier stage 6, and a second freewheel transistor 18 is added to the second freewheel circuit of the first rectifier stage 6. The second freewheel circuit 17 is coupled in series upstream of the first freewheel diode 13*a* in the first on-state direction. The second freewheel circuit 18 is coupled in series with the first freewheel circuit 13*b* in the second on-state direction.

The neutral wire is coupled to the branch formed by the two freewheel diodes 13*a* and 17 connected in series, the coupling being made between the two freewheel diodes 13*a* and 17, and the branch formed by the two freewheel circuits 13*b* and 18 connected in series, the coupling being made between the two freewheel transistors 13b and 18.

It is also possible to use the device 1 produced according to this embodiment with a single-phase power supply network by coupling the neutral wire of the single-phase power supply network to the dedicated input coupled to the branch comprising the two freewheel diodes 13a and 17.

Figure 6:
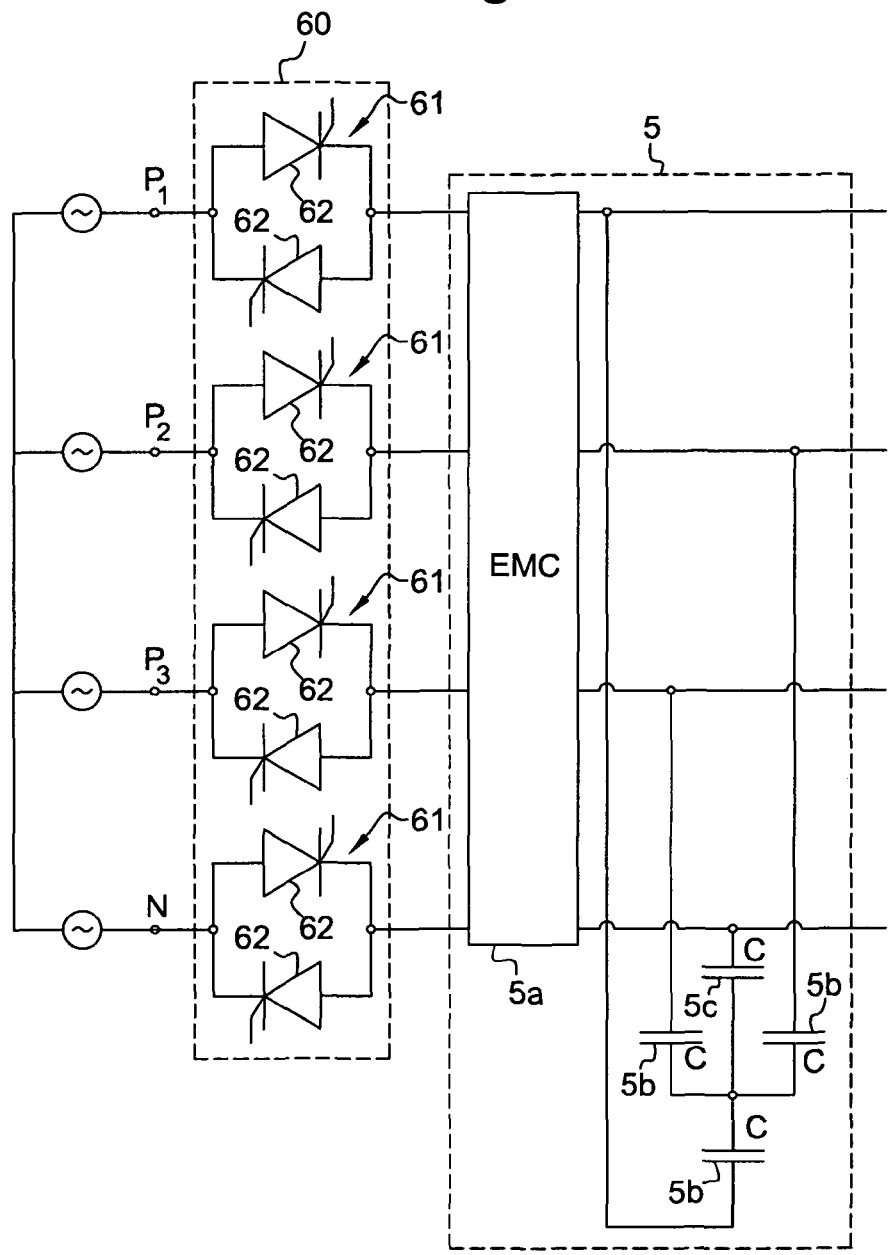
FIG. 6 represents schematically means for protecting the integrated filtering means.

FIG. 6 shows schematically means 60 for protecting the integrated filtering means 5.

The filtering means 5 comprise an electromagnetic compatibility (EMC) filter 5a, and filtering capacitors 5b placed "in star formation" so as to perform filtering between each phase. The EMC filter 5a is, for example, a common-mode inductor and capacitor filter making it possible to filter the current pulses generated by the transistors of the first stage 6 and of the second stage 7 of the device 1. The filtering means 5 make it possible to filter the current thus absorbed so that the current meets the network-connection requirements imposed by the network operators, in terms of harmonics and those of the motor vehicle field.

In the configuration taking account of the neutral N, a neutral-filtering capacitor 5c is also placed between the neutral wire N and the common point C of the filtering capacitors 5b. The latter capacitor 5c makes it possible to carry out filtering between the neutral wire and the phases.

Instead of an arrangement of the capacitors "in star formation", it is also possible to place the capacitors 5b in a "triangle" formation (not shown), that is to say by placing the capacitors between each phase and the neutral at the output of the EMC filtering means 5a. This reduces the value of the current which passes through them. In this "triangle" formation, it is not necessary to provide the neutral-filtering capacitor 5c.

In recharging mode, the connection of the device 1 to a power supply network can cause a generation of high current peaks since the difference between the initial voltage of the input capacitors, such as the EMC filtering means 5a and/or the filtering capacitors 5b, and the voltage of the power supply network is great at the time of connection.

The protection means 60 comprise a triac 61, or an arrangement equivalent to a triac such as two thyristors 62 coupled in an antiparallel manner, inserted between the means 4 for connection to the power supply network 3 and the filtering means 5 on each of the phases $P_1$, $P_2$, $P_3$, and N depending on the embodiment. The protection means 60 operate according to a principle of preloading of the filtering capacitors which makes it possible, via the control of the trigger-gate of the triac 61 to limit the conduction and thus the current peak on start-up.

Figure 7:
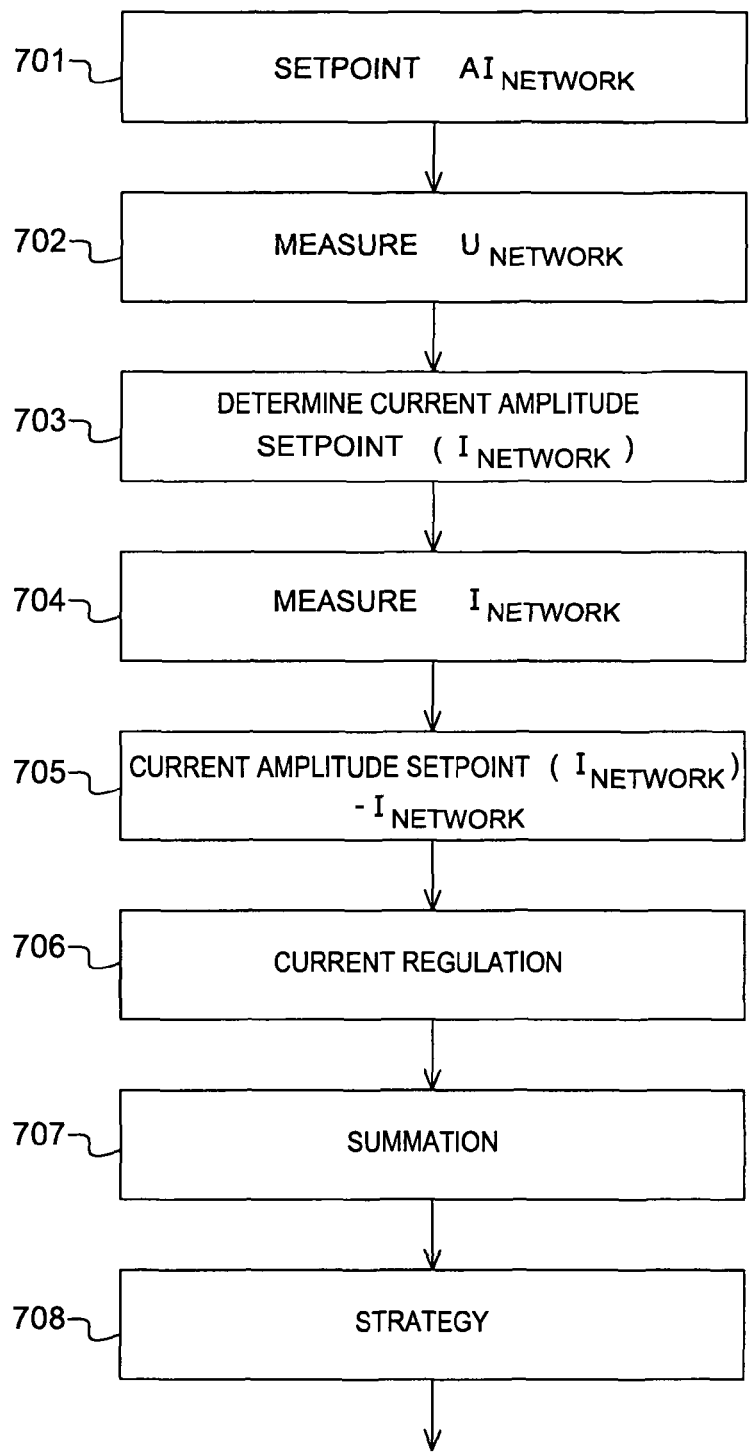
FIG. 7 shows a flow chart of a method for generating electric power to an electricity power supply network according to one embodiment.

FIG. 7 shows a flow chart of a method for generating electric power of a device 1 for charging and/or generating electric power of a traction system of a motor vehicle to a electricity power supply network according to one embodiment.

In a first step 701, a setpoint of network current amplitude $A_{1network}$ is delivered corresponding to the amplitude of the current that it is desired to deliver to the network from the device 1.

In a subsequent step 702, the network power supply voltage $U_{Network}$ imposed by the distributor is measured. This voltage is measured and injected into phasing means 22, such as a phase-locked loop, before being inserted, in a step 703, into a computing means 21 receiving the network current amplitude setpoint also as an input, and delivering as an output a network current setpoint Setpoint($I_{Network}$).

In a subsequent step 704, the current $I_{Network}$ delivered by the device 1 to the power supply network is measured in order to compare it, in a step 705, with the network setpoint Setpoint($I_{Network}$).

In a step 706, a current regulation is determined based on the difference determined in step 705. The regulation thus determined is added, in a step 707, to the network current setpoint Setpoint($I_{Network}$) previously processed by proaction means.

In a final step 708, the resultant signal is injected into strategic means 27 which determine a control of the device 1 so that the latter delivers the desired current to the power supply network.

Figure 8:
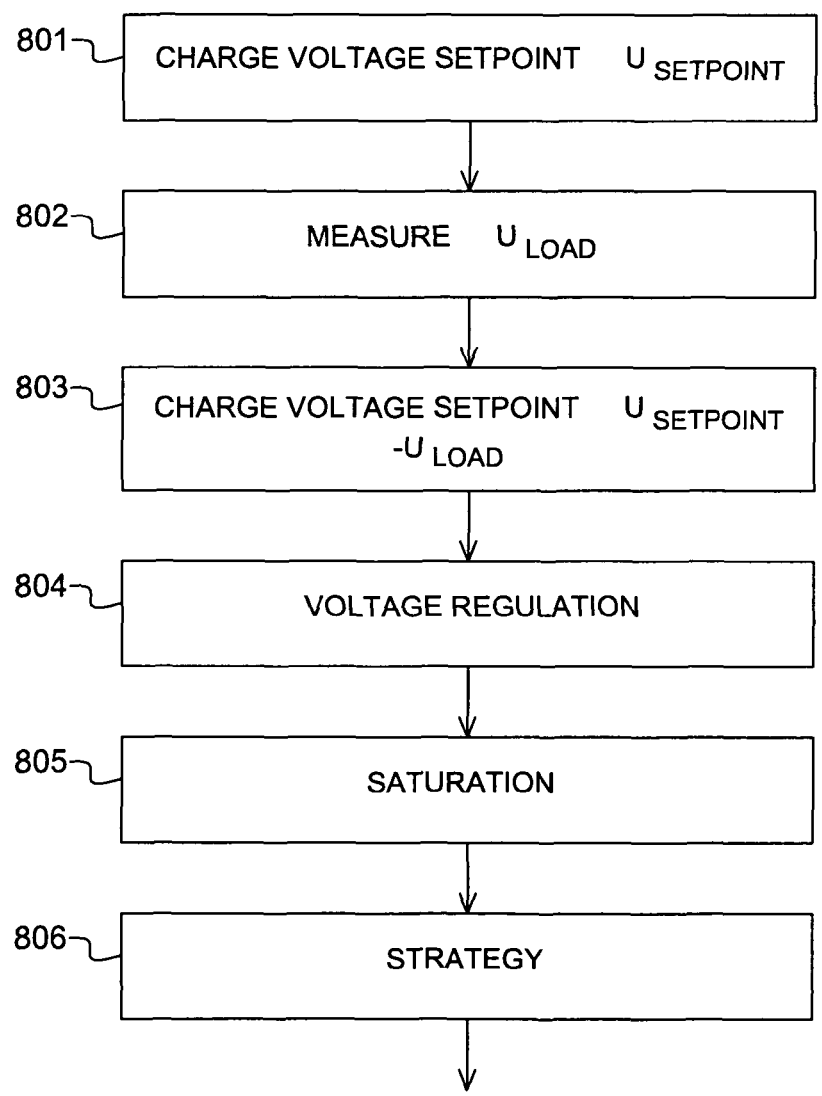
FIG. 8 shows a flow chart of a method for powering a load from a device for charging and/or generating electricity or a traction system of a motor vehicle according to one embodiment.

FIG. 8 shows a flow chart of a method of powering a load from a device for charging and/or electricity generation of a traction system of a motor vehicle according to one embodiment.

In a first step 801, a load voltage setpoint $U_{setpoint}$ is delivered corresponding to the voltage that it is desired to deliver to deliver the load from the device 1.

In a subsequent step 802, the voltage $U_{load}$ delivered by the device 1 to the terminals of the load is measured.

Then, in a step 803, the voltage setpoint $U_{setpoint}$ is compared with the measured voltage $U_{load}$, and the measured difference is delivered to regulation means 32 which determine, in a subsequent step 804, a voltage regulation which makes it possible to deliver a current setpoint to be applied by the device 1 to the load in order to have the desired voltage at the charge.

In a subsequent step 805, the current setpoint determined in the previous step is saturated so as not to overload the converter, which has the effect of reducing the voltage applied to the load when its impedance becomes too low.

In a final step 806, the resultant signal is injected into the strategy means 34 which determine the control of the device 1 in order to deliver the current corresponding to the setpoint in order to have the desired voltage at the terminals of the load.

The device 1 thus described makes it possible to dispense with the constraint which demands that the battery voltage is always higher than the maximum voltage of the power supply network.

Moreover it makes it possible to use only the inductance of the stator coils 14 of the device 1 as a power buffer filter. Specifically, when the charging power is high, the space requirement and the weight of such an inductive and/or capacitive filter would become prohibitive to be installed onboard a motor vehicle.

Additionally, it offers the possibility of allowing the operation of the device in charging mode or in traction mode without having to use contactors for the switching of the operating modes.

It allows a more rapid charging of the battery 2.

Moreover, the device 1 makes it possible to power a load from a motor vehicle, in three-phase or in single-phase mode, without having need of a contactor.

The device 1 also makes it possible to return electric power generated by the device to a power supply network which is connected to it.

The invention claimed is:

1. An electronic device for charging and/or generating electric power for a traction system of a motor vehicle coupled to a battery, the electronic device comprising:

a rectifier stage connectable directly to a single-phase or a three-phase power supply network or to a load to be powered;

an inverter stage connectable to the battery;

regulation circuitry that regulates average current flowing between the rectifier stage and the inverter stage as a function of a voltage of the battery; and control circuitry that controls a transfer of electric power between the power supply network and the battery, or a transfer of electric power to the load from the battery.

2. The electronic device according to claim 1, wherein the control circuitry includes:

a current-regulation circuitry portion that regulates power supply current of the power supply network as a function of a current setpoint of the power supply network; and a voltage-regulation circuitry portion that regulates voltage at terminals of the load.

3. The electronic device according to claim 1, wherein the rectifier stage includes:

a first controlled rectifying circuitry portion that rectifies current in a first on-state direction; and a second controlled rectifying circuitry portion that rectifies current in a second on-state direction opposite to the first on-state direction.

4. The electronic device according to claim 1, wherein the rectifier stage includes freewheel circuitry that allows current to flow in the inverter stage when other elements of the rectifier stage are in an off-state.

5. The electronic device according to claim 4, wherein the freewheel circuitry includes:

a first freewheel circuitry portion that allows current to flow in one direction; and a second freewheel circuitry portion that allows current to flow in another direction opposite to said one direction of the first freewheel circuitry portion.

6. The electronic device according to claim 4, wherein the freewheel circuitry includes at least one freewheel diode and/or at least one freewheel transistor.

7. The electronic device according to claim 1, wherein the electronic device is configured to be mounted in the motor vehicle with an electric traction device, and wherein the inverter stage includes the electric traction device of the motor vehicle.

8. The electronic device according to claim 1, further comprising filtering circuitry integrated into the motor vehicle that filters power supply network current absorbed by the electronic device during charging of the battery.

9. The electronic device according to claim 8, wherein the filtering circuitry integrated into the motor vehicle includes protection circuitry that protects the electronic device from current peaks when the electronic device is connected to the power supply network.

10. The electronic device according to claim 1, further comprising stator coils, a first input/output of the stator coils being connected to the rectifier stage and a second input/output of the stator coils being connected to the inverter stage.

11. The electronic device according to claim 1, wherein an output of the rectifier stage is connected to an input of a group of stator coils, and wherein an output of the group of stator coils is connected to an input of the inverter stage.

12. The electronic device according to claim 1, further comprising a current sensor connected between the converter stage and the inverter stage that measures an output current of the converter stage and that feeds back the output current of the converter stage to the regulation circuitry to regulate the average current flowing between the rectifier stage and the inverter stage.

13. The electronic device according to claim 1, wherein the average current flowing between the rectifier stage and the inverter stage is regulated so as to be equal to a current value established based on a maximum current supplied by the power supply network as a function of a coefficient at least equal to a ratio between a maximum voltage rectified by the rectifier stage and the voltage of the battery.

14. The electronic device according to claim 1, wherein the average current flowing between the rectifier stage and the inverter stage is regulated so as to be maintained at all times at a value above a value of current that is input into the battery, and wherein the value is above the value of current input into the battery by a fixed predetermined value.

15. A method for loading and/or generating power for a traction system of a motor vehicle coupled to a battery, using an electronic device, the electronic device comprising:

a rectifier stage configured to be connected to a power supply network or to a load to be powered;

an inverter stage configured to be connected to the battery; and circuitry configured to regulate average current flowing between the rectifier stage and the inverter stage, the method comprising:

controlling transfer of electric power between the power supply network and the battery, or controlling transfer of electric power to the load from the battery, based on a mode of operation selected from a plurality of modes of operation, wherein said controlling includes regulating the average current flowing between the rectifier stage and the inverter stage as a function of a voltage of the battery in a first mode of operation.

16. The method according to claim 15, wherein, when said controlling involves the transfer of electric power between the power supply network and the battery, the current generated in each phase of the power supply network is regulated based on a current setpoint generated based on a measurement of voltage of the power supply network.

17. The method according to claim 15, wherein, when said controlling involves controlling transfer of electric power to the load from the battery, voltage at terminals of the load is regulated using a regulation loop.

18. The method according to claim 15, wherein current of a second stage of the rectifier phase is allowed to flow in freewheel circuitry in a freewheel phase.

19. The method according to claim 15, further comprising filtering current of the power supply network using an integrated filter.

20. The method according to claim 19, wherein the integrated filter is protected from current peaks due to connection to the power supply network with aid of a protection mechanism of triacs by preloading filtering capacitors of the integrated filter.

* * * * *